United States Patent [19]

Wolde-Michael

[11] Patent Number: 4,521,313

[45] Date of Patent: Jun. 4, 1985

[54] FLUID PURIFICATION SYSTEM

[75] Inventor: Girma Wolde-Michael, Little Canada, Minn.

[73] Assignee: Donaldson Company, Inc., Minneapolis, Minn.

[21] Appl. No.: 603,776

[22] Filed: Apr. 25, 1984

Related U.S. Application Data

[63] Continuation of Ser. No. 368,650, Apr. 15, 1982, abandoned.

[51] Int. Cl.³ .............................................. C02F 1/40
[52] U.S. Cl. .................................... 210/776; 210/781; 210/787; 210/788; 210/805; 210/806
[58] Field of Search ............... 210/776, 781, 782, 787, 210/788, 805, 806, 167

[56] References Cited

U.S. PATENT DOCUMENTS

| | | | |
|---|---|---|---|
| 3,456,798 | 7/1969 | Urdanoff | 210/167 |
| 3,540,588 | 11/1970 | Estabrook | 210/167 |
| 3,596,769 | 8/1971 | Baldwin | 210/167 |
| 3,679,051 | 7/1972 | Larson | 210/167 |
| 3,897,335 | 7/1975 | Brand | 210/776 |
| 3,925,204 | 12/1975 | Cheysson | 210/776 |
| 4,366,069 | 12/1982 | Dudrey | 210/776 |

OTHER PUBLICATIONS

"Model Car-30 Coolant Recovery System", published by Donaldson Company, Inc., Nov. 1980.

*Primary Examiner*—Ernest G. Therkorn
*Attorney, Agent, or Firm*—Merchant, Gould, Smith, Edell, Welter & Schmidt

[57]  ABSTRACT

The present invention is a process for purifying a fluid, particularly an industrial coolant fluid, contained within a contaminated mixture which includes mechanically emulsified as well as free or floating oil and various solid matter including metal fines. The process includes several steps for separating and recovering the coolant fluid from the mixture generally by fluid displacement and centrifugal separation. Recovered coolant fluid is regenerated with freshly made coolant fluid and any stored, recovered coolant fluid not immediately reused is recycled through a portion of the system to prevent any degradation of the stored fluid.

3 Claims, 6 Drawing Figures

FLUID PURIFICATION SYSTEM

This is a continuation of application Ser. No. 368,650 filed Apr. 15, 1982 now abandoned.

TECHNICAL FIELD

The present invention relates to systems for purifying contaminated fluids, and more particularly to a process for purifying a heavier fluid, such as a water-based industrial coolant fluid, by removing mechanically emulsified as well as free or floating lighter fluid and solid matter from the heavier fluid.

BACKGROUND

The present invention is an improvement of the Coolant Recovery System, of which I am a joint inventor, described and claimed in application, U.S. Ser. No. 254,751 filed Apr. 16, 1981, now U.S. Pat. No. 4,366,069. The earlier coolant recovery system, while also recovering a heavier coolant fluid from a contaminated mixture, uses multiple-pass fluid flow of the fluid and the contaminated mixture through the system because of limited settling area and retention time. It is designed to accommodate, in comparison to the present invention, relatively high volumes of fluid at its optimum performance.

In the industries in which the coolant recovery system and the present invention are directed, a certain degree of cost-effectiveness and flexibility in the systems are required. The earlier coolant recovery system was one solution to the industries' needs. The present invention provides yet another answer to industry demands for a system to recover valuable fluids which would otherwise be disposed of after only one use. It is believed the present invention is an advancement in the state of the art for fluid recovery systems. A single-pass of the contaminated mixture through the system effectively recovers the heavier or coolant fluid. A minimum of equipment is required to achieve significant recovery results efficiently and with less expense. For example, the present invention utilizes a more dependable means of skimming, namely fluid displacement, to remove surface carried lighter fluid. In contrast, other systems might use various mechanical skimmers, or, as in the earlier coolant recovery system, a forced vortex might be used to skim the contaminated fluid tank surface. It is believed the skimming means of the present invention provides a more dependable means than those requiring mechanical devices to effect the skimming.

Whereas the earlier coolant recovery system required a preset amount of contaminated coolant to be introduced into the system for cleaning, the present invention is believed able to accommodate any amount up to 150 gallons per batch. Furthermore, the earlier coolant recovery system utilized the oil concentrate tank exclusively for collecting oil from the centrifuge. In contrast, the present invention utilizes an oil concentrate tank to collect surface oil from the contaminated fluid volume, in addition to capturing oil from the centrifuge.

In the earlier invention the centrifuge is the primary means of separation which, during service and maintenance of the centrifuge, makes the system vulnerable to downtime. In the present invention the centrifuge is used to "polish" the fluid and remove mechanically emulsified oils, with the dragout assembly removing all particles larger than 15 (based upon steel sp. gr. 7.0 gm/cc). For most machine tool operations this level of clarity is more than adequate. Thus if the centrifuge requires maintenance and is thus inoperative, the system will provide adequate filtration without interruption.

Also in the earlier coolant recovery system, the idle mode or off-cycle recirculating mode is not capable of recirculating the complete volume of coolant in the clean tank. Only twenty percent of the coolant may be recirculated. The present invention may provide recirculation of one hundred percent of the clean coolant in the storage tank during the fifth step of the present invention.

Additionally, in the earlier coolant recovery system, fines and oil globules are able to build up in the bottom of the clean tank thus requiring occasional maintenance by plant personnel. In the present invention, fines which may conceivably collect in the bottom of the clean tank are picked up by the transfer pump during the second or oil skimming step, thus discouraging the build up of fines and other contaminants in the bottom of the clean tank.

Furthermore, in the earlier system, the clean tank was designed to overflow into a semi-clean tank which accepted the skimmed surface oil. The centrifuge would then have to be activated to remove the skimmed oil. Certain mechanical emulsification was likely to occur in the feed pump during the transfer of the skimmed oil to the centrifuge, thus making the filtration process rather inefficient. The present invention "isolates" floating oil, preventing it from going into the centrifuge, by utilizing direct overflow skimming of the clean tank, and introducing any floating oil thus skimmed into the dragout assembly, where it will eventually be transferred into the oil concentrator tank.

SUMMARY OF THE INVENTION

The present invention is a process for separating a heavier fluid, e.g. an industrial coolant fluid, from a contaminated mixture containing a lighter fluid, e.g. oil, and solid matter, e.g. metal fines. The process includes five functional steps which are distinguished in the description hereinafter. The process includes the use of two separate volumes of fluid, one volume being the contaminated mixture, the second volume being already recovered, substantially clean heavier fluid. A portion of the earlier recovered fluid is introduced into the contaminated mixture volume and is thus "recontaminated". A sufficient volume of substantially clean fluid is transferred into the contaminated fluid volume in order to raise the level of the contaminated fluid surface to allow skimming of the surface. Such skimming will be effective in that a portion of the lighter fluid, i.e. the free or floating oil, in the mixture will have already separated and formed a distinct, surface-carried layer upon the mixture volume.

The "recontamination" aspect of the process also provides a scavenging effect upon the bottom of the clean tank. Superfine particles suspended in the clean fluid contained in the separate volume of heavier fluid will tend to agglomerate and mature thus settling in the bottom. A transfer pump will pick up the settled matter and reintroduce it into the dragout assembly, thus keeping the volume of heavier fluid clean.

Yet another advantage of the "recontamination" is to eliminate floating oil skimmers. Still another advantage is to enable the user to introduce any amount of the fluid volumes within the system from one volume to the other, thus eliminating unnecessary storage and equipment which would otherwise be required.

Subsequent to the skimming of the surface-carried lighter fluid into an oil concentrator, a portion of the contaminated mixture is pumped to a multi-phase centrifuge where the heavier fluid, the lighter fluid, and the suspended solid matter are separated apart from each other. The separated heavier fluid is then transferred to the volume of earlier recovered fluid. The separated lighter fluid is transferred to the concentrator, and the solid matter is deposited for removal to a remote location.

Preferably, the stored recovered heavier fluid is regenerated and the volume replenished in order to maintain the storage volume in a full condition at all times.

It is also advantageous to refresh the stored, recovered fluid by circulating a portion of the contaminated mixture through the centrifuge. The heavier fluid recovered in this step is introduced into the storage volume of recovered fluid in a manner which aerates the stored fluid.

These and other advantages and aspects of the invention will become apparent after a reading of the specification and claims which follow.

DETAILED DESCRIPTION

The present invention is a process or method for purifying a fluid. Prior to describing the preferred apparatus for practicing the invention, the method itself will be described in detail.

Figure 1:
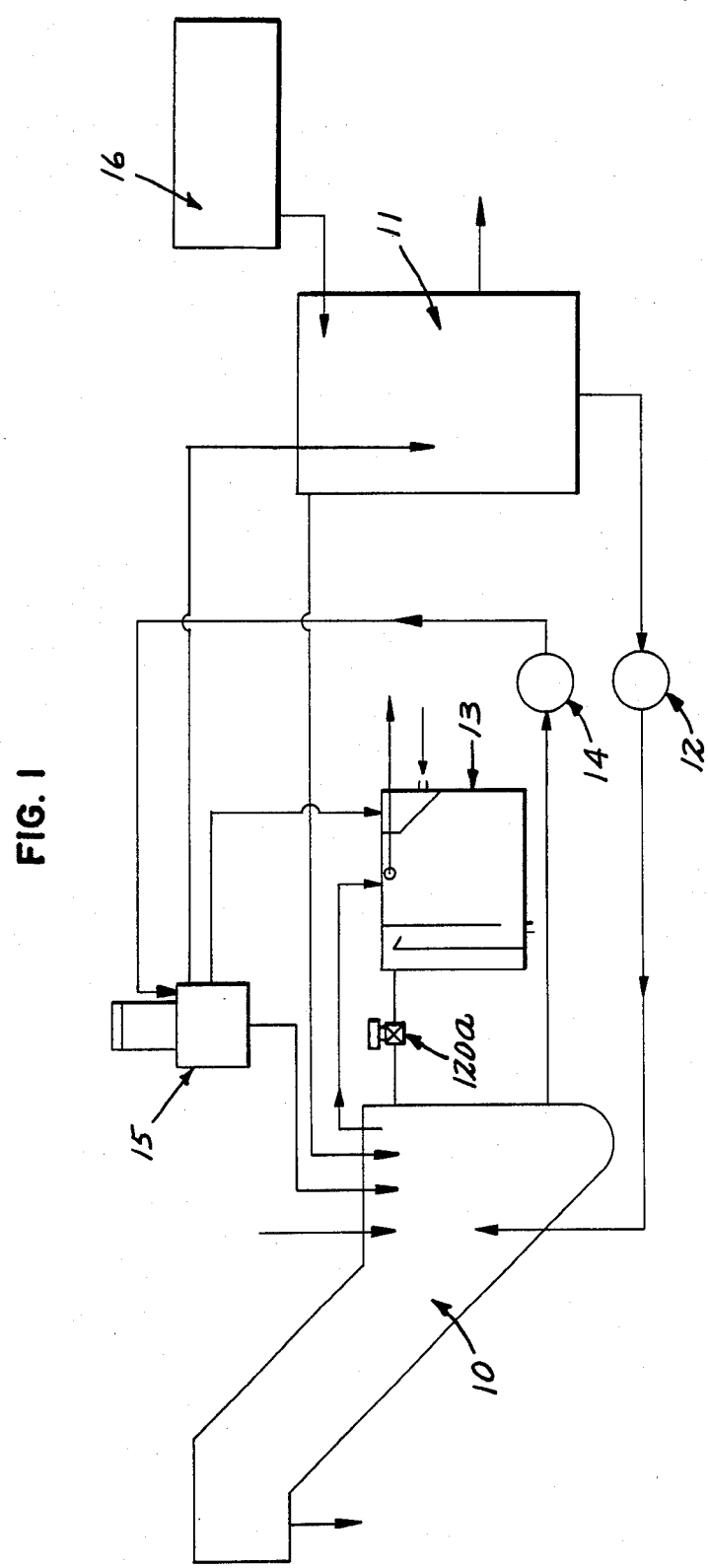
FIG. 1 is a schematic diagram illustrating the various fluid flow paths of the present invention.

In FIG. 1 the five functional steps of the purifying method are schematically illustrated. The first step is generally referred to as large bulk removal. Contaminated fluid mixture, containing the fluid which is to be recovered along with mechanically emulsified as well as free or floating lighter fluid and various solid matter, is deposited into a standard dragout-tank assembly 10. A dragout or scraping mechanism in the assembly is operated for an initial period of time, e.g. fifteen minutes to remove relatively heavy or bulk solid matter which have settled out from the mixture into the lowermost portion of the assembly. The rate of operation generally will allow removal of the solid matter from the assembly 10 in a substantially dry state. The removed solids are then appropriately deposited or recovered depending upon the demands of the particular industry. Following this initial period of dragout operation, the assembly 10 is idled in a quiet mode for a certain period of time, e.g. thirty minutes. The quiet condition within the dragout assembly 10 allows the readily separable lighter fluid, e.g. free oil, to separate from the mixture and float upon the surface of the contaminated volume in the assembly. This step, in effect, will cause a partial purification of the contaminated mixture.

Following the idling period of the dragout assembly 10 and after a surface carried layer of lighter liquid has built up upon the mixture volume, the second step of the process is initiated. In the second step a skimming of the contaminated volume occurs. A volume of earlier recovered heavier fluid, e.g. coolant is held separately in the system in a storage tank 11. A transfer or feed pump 12 is used to pump clean coolant from the storage tank 11 into the dragout assembly 10. The clean coolant, in effect is "recontaminated" with the now partially-cleaned contaminated mixture, and in a manner which does not disturb the surface-carried layer of lighter fluid or oil. Overflow and turbulent velocities are thus preferably avoided in the transfer of the fluid into the assembly 10. A sufficient volume of clean coolant is transferred to the dragout assembly 10 until a high-level switch in the assembly 10 is activated by the increased volume, thereafter a preset delay time is allowed to elapse. When the assembly becomes substantially full at the conclusion of the preset delay time, the surface-carried oil is "skimmed" from the assembly 10 by means of fluidically displacing a portion of the volume into an adjacent oil concentrator 13 where the skimmed portion, containing oil and coolant, is further concentrated for recovery. Also, during this step, a valve, e.g. a motorized pneumatic valve, connecting the dragout assembly 10 to a clean fluid outlet of the adjacent oil concentrator is closed.

After the layer of surface carried oil has been skimmed from the contaminated volume mixture in the assembly 10, the third step of the process begins. In the third step fine contaminant and fluid separation occurs. A second transfer pump 14 transfers the now partially-cleaned contaminated mixture volume from the assembly 10 to a multiphase centrifuge 15 where the suspended solid fines (typically less than 15 microns as based upon the specific gravity of steel or greater than 7.00 grams per cubic centimeter), the heavier coolant fluid and the lighter fluid or oil are separated apart from each other. The operation of the centrifuge is such that the contaminated mixture passes through the centrifuge 15 only once and the individual components in the contaminated mixture are effectively separated during that single-pass. Separated solid fines within the centrifuge 15 are purged and redeposited into the dragout assembly 10 where they are removed via the operation of the dragout mechanism in the assembly. The separated lighter fluid or oil is transferred for deposit into the oil concentrator 13. The heavier coolant fluid is directly routed for deposit into the storage tank 11. This step will be automatically terminated when a preset low level switch is activated within the dragout assembly 10. The motorized valve between the dragout assembly and oil concentrator is opened during this step after a preset time has elapsed after the start of the third step. The opened valve will allow the transfer of substantially clean heavy fluid from the concentrator to flow back into the dragout assembly, after being separated from the lighter fluid in the concentrator.

At the termination of the third or separation step, an optional fourth step may be included. The fourth step provides regeneration of the recovered heavier coolant fluid and replenishment of the fluid volume in the storage tank 11. Preferably the storage tank 11 is maintained in a full condition at all times. Therefore, at the conclusion of the third step, if the tank 11 is not sufficiently full, the fourth step is initiated. A standard proportioner 16 is located near the storage tank 11 and provides the components (i.e. water and chemical additives) for regenerating and replenishing the fluid in the storage tank 11. This step is automatically terminated when a preset high fluid level is reached within the tank 11. When the high fluid level is reached, the surface of the fluid may contain surface-carried oil and so it is "skimmed" by overflowing fluid from the storage tank 11 into the dragout assembly 10.

When the entire system has been idled for a predetermined length of time, the fifth step, or off-cycle recirculation of the recovered fluid, is carried out. Preferably the system will include a microprocessor to effect and perform the logical requirements of the present invention. However, the entire process may be completed by timers or transistor-to-transistor logic to control the termination and initiation of each successive step in the present invention. A microprocessor, in a sense, will "remember" when the last normal cycle of steps was completed. After the predetermined interval of time, following the end of the fourth step, has elapsed the microprocessor will engage the recirculating step. During this step the second transfer or feed pump 14 is operated to transfer the fluid mixture contained within the dragout assembly 10 to the centrifuge 15 where it is processed. The heavier coolant fluid separated out in this step is transferred to the storage tank 11 where it is introduced into the tank 11 in a manner and at a location where its entry into the tank 11 will "refresh" the stored fluid, as well as help prevent degradation of the stored fluid. The fluid used to refresh the stored recovered coolant fluid should be introduced into the tank 11 at a bottommost location so that the entering fluid has an upward movement through the stored fluid and essentially results in an aeration of the stored fluid. Such aeration will assist any settling which may be occurring as well as expedite any necessary separation of light fluid or oil from the coolant fluid. If the added refreshing fluid is of a volume which will cause an overflow of the storage tank 11, fluid will be transferred from the bottom of the tank 11 to the dragout assembly 10 via the first transfer pump 12. Any settling of solids within the storage tank 11 may be removed by scavenging means constructed in connection with the fluid conduit used to transfer fluid from the tank 11 to the assembly 10.

The five steps of the present invention provide a complete and unified fluid purification system which uses the principles of fluid displacement to achieve effective purification of the coolant fluid without requiring extensive or complicated equipment. Minimum fluid flow volumes are not required in the present invention in order to obtain optimum performance. Significant reliance is placed on gravitational settling, surface skimming, and the fluid overflow and inlet locations in the various apparatus in order to most efficiently recover the valuable fluid from the contaminated mixture. The use of a single pass centrifuge further reduces the time and energy demands of the system without sacrificing system efficiency. The aeration of the stored recovered fluid is a particularly important principle applied to the system to help prevent otherwise unavoidable fluid degradation due to bacteria growth.

PREFERRED APPARATUS FOR PRACTICING THE INVENTION

Figure 2:
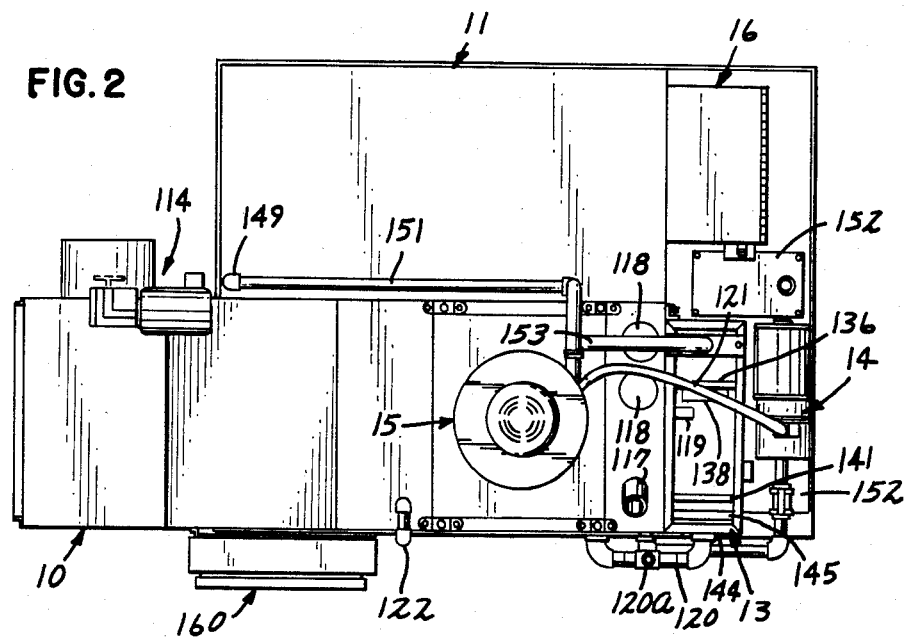
FIG. 2 is a top plan view of the preferred apparatus for practicing the present invention.
Figure 3:
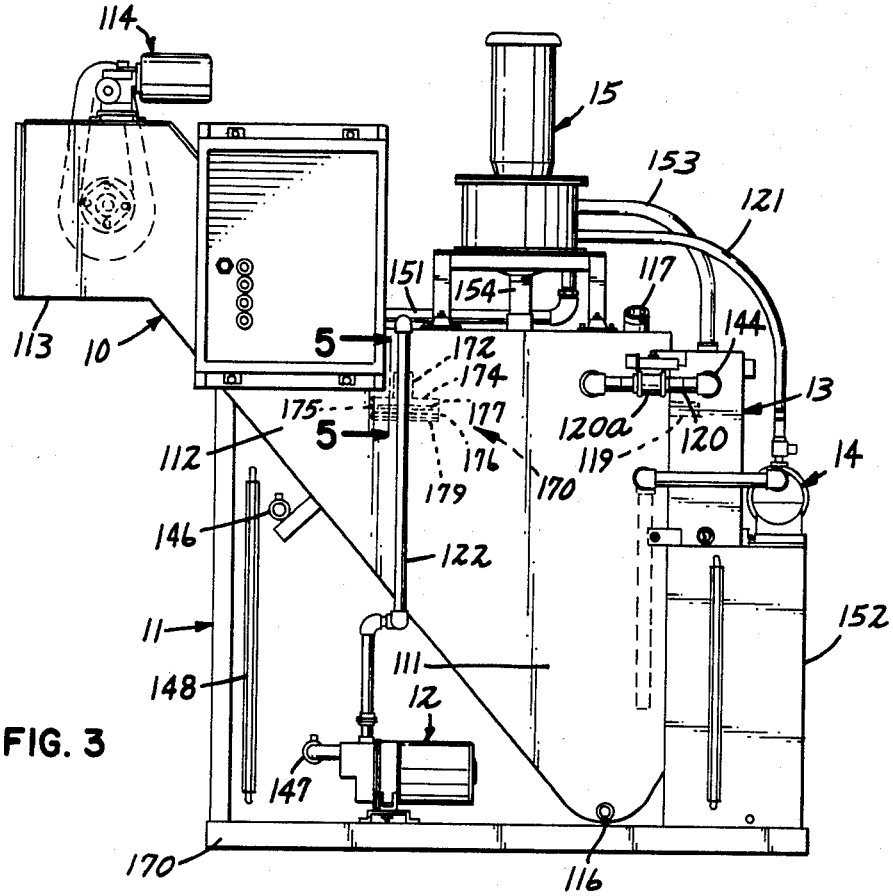
FIG. 3 is a side elevational view of the apparatus shown in FIG. 2.

The preferred apparatus for practicing the fluid purification system is shown in FIGS. 2–6. Referring now to FIGS. 2 and 3, it can be seen that the preferred apparatus is a relatively compact arrangement of the various structure shown schematically in FIG. 1. The dragout assembly 10 includes a tank-like lower portion 111 in which the majority of the contaminated mixture volume is held prior to processing. Extending generally upwardly and from a side of the lower portion 111 is an elevator portion 112. A standard scraping mechanism found in commercially available dragout assemblies traverses the bottommost portion of the assembly 10 and the full length of the elvator portion 112. An outlet 113 for the solids removed by the scraping mechanism is provided at the uppermost end portion of the dragout assembly 10. Drive means 114 is provided for the operation of the scraping mechanism. Generally the dragout assembly is closed by a cover 115 but such is not mandatory. A drain outlet 116 is provided at the lowermost portion of the assembly to facilitate routine cleaning of the assembly 10. A dirty inlet 117 is positioned in a portion of the cover 115 directly above the tank-like portion 111 of the assembly 10. Various liquid level controls 118, such as standard automatic switches, are also provided. Along an upper side edge of the assembly, generally at the end opposite the solids outlet 113, an overflow outlet 119 is positioned to allow the fluid skimmed during the second step of the process to exit into the waste oil concentrator 13. The waste oil concentrator 13 will be described in detail hereinafter. A pipe 120, including a pneumatic motorized valve 120a arranged in a portion of the pipe 120, is fluidically connected with the coolant outlet 144 of the waste oil concentrator 13 and an upper portion of the dragout assembly 10. A second pipe 122 is fluidically connected to the dragout assembly 10 and to the clean or storage tank 11. A feed or transfer pump 12 is positioned in a portion of the pipe 120 to control the flow of fluid between the assembly 10 and the storage tank 11 during the second step of the process. A third pipe 121 connects the dragout assembly 10 to the inlet portion of the centrifuge 15 for transfer of contaminated mixture from the assembly 10 for processing by the centrifuge 15. The second feed or transfer pump 14 is positioned along a portion of the pipe 121 to control the flow of fluid therethrough during both the third and fifth steps of the process.

Figure 5:
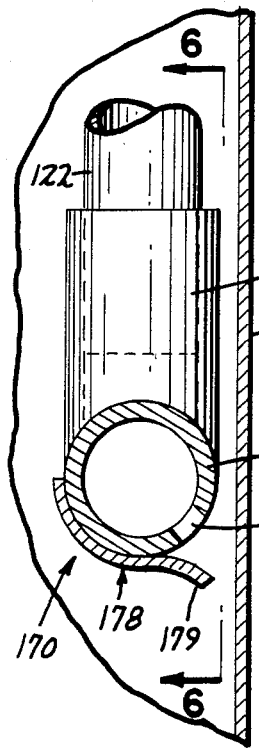
FIG. 5 is a cross-sectional view of one portion of the preferred apparatus for practicing the present invention as seen generally along line 5—5 in FIG. 3.
Figure 6:
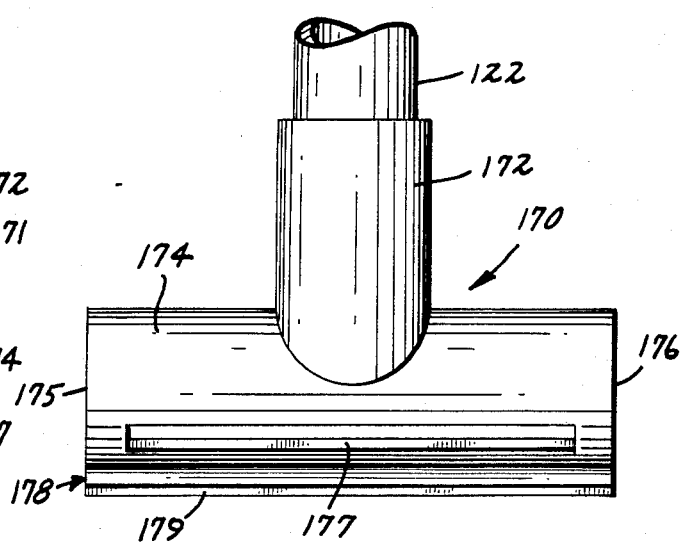
FIG. 6 is a front-elevational view of the portion of the apparatus as seen generally from line 6—6 in FIG. 5.

In order to achieve as quiet of an inflow of fluid as possible and to prevent overflow and turbulent velocities in the clean fluid released into the dragout assembly 10 during the second step of the process, a unique feed inlet 170 for the fluid is provided at the end of the pipe 122 contained in the dragout assembly 10. Referring now to FIGS. 5 and 6, the inlet 170 is shown as preferably positioned adjacent to and facing generally towards a side wall 171 of the dragout assembly 10. The inlet 170 is a substantially T-shape member having an upper connecting portion 172 into which the free end of the pipe 122 is secured. A lower portion 174 of the inlet 170 extends transversely from the connecting portion 172 and comprises a generally hollow cylindrical member with closed opposite ends 175, 176. Extending along a major portion of the length of the cylindrical portion 174 is a relatively thin opening or slot 177 through which the transferred clean fluid is released into the dragout assembly 10 from the pipe 122. The opening 177 is constructed in the cylindrical portion 174 in a manner such that the clean fluid from the pipe 122 will be distributed along the cylindrical portion 174 and released through the opening 177 generally downwardly and outwardly towards the assembly side wall 171. A curvilinear flange member 178 is secured at a lowermost area and along the full length of the cylindrical portion 174. A free edge or lip portion 179 of the flange 178 extends outwardly apart from the surface of the lower portion 174. This lip portion 179 is positioned so as to extend generally towards the side wall 171 a sufficient distance such that the clean fluid exiting the slot 177 will first contact the lip portion 179. The lip portion 179 serves to absorb energy which would otherwise create turbulent velocities in the clean fluid. The lip portion 179 as well as the opening 177 serve as flow quietening means for the incoming clean fluid. Additionally, the lip portion 179 directs the incoming clean fluid in a direction generally towards the side wall 171 where the fluid is guided downwardly into the dragout assembly 10 by the sidewall 171. Preferably the inlet 170 is positioned closely adjacent to the sidewall 171 in order to provide a relatively small space between the free edge of the lip portion 179 and the sidewall 171. In this manner, the fluid released from the inlet 170 will form a relatively thin layer of fluid spread-out along a relatively large area. Fluid released into the dragout assembly 10 by the inlet 170 should thus not cause any disturbance to the formation of the layer of surface-carried free oil upon the contaminated mixture volume. The volume of transferred fluid will raise the level of the contaminated mixture volume a pre-determined height without disturbance to the surface-carried layer of fluid, and skimming of the surface-carried oil may then be initiated.

Figure 4:
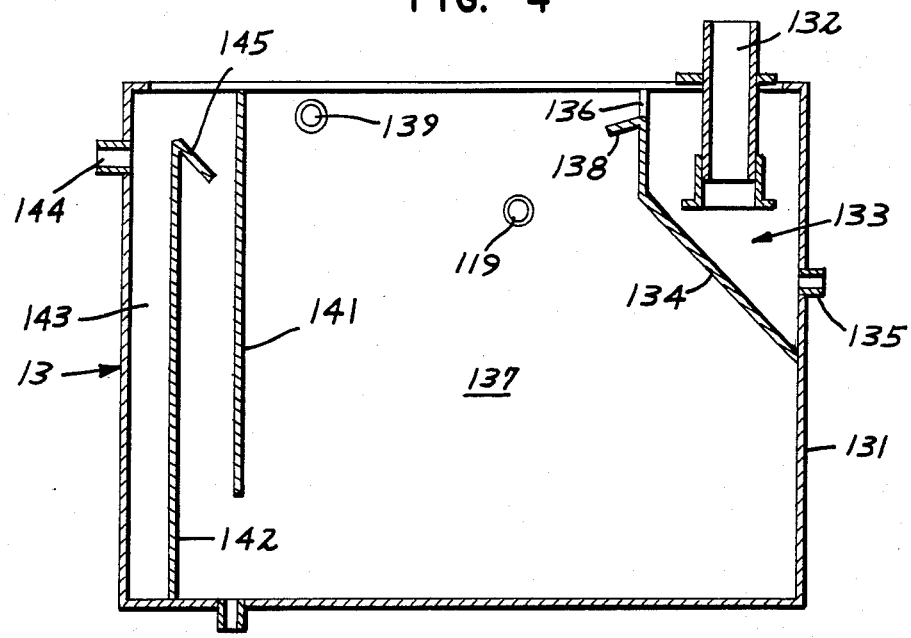
FIG. 4 is a cross-sectional view of one portion of the preferred apparatus for practicing the invention.

The waste oil concentrator 13 is positioned adjacent the overflow outlet 119 of the dragout assembly 10. A cross-sectional view of the concentrator is shown in FIG. 4. The construction and operation of the concentrator 13, is shown in U.S. application Ser. No. 368,648, now U.S. Pat. No. 4,422,931, filed by me, concurrently herewith, and assigned to Donaldson Company, Inc., the disclosure of which is hereby incorporated by reference. A brief description will be given with respect to FIG. 4 for the purposes of understanding the role of the concentrator in the present invention. The concentrator serves as a final removal stage for the solid fines which remain suspended within small oil globules contained in the contaminated mixture and which are not completely removed within the centrifuge. Generally, however, the concentrator 13 is used to separate the lighter fluid (oil) and the heavier fluid (coolant) which have been skimmed from the surface of the dragout assembly. In FIG. 4 it can be seen that the concentrator 13 comprises a tank 131 of sufficient volume to accommodate the flow rate demands in the other parts of the system. An inlet 132 is positioned at one end and is directed generally downwardly into the tank to introduce the separated lighter fluid or oil from the centrifuge into a first chamber 133 which has an angled bottom portion 134. An initial separation of oil and coolant occurs in the chamber 133 due to the specific gravity differences between the two fluids. Means 135 for aerating the first chamber 133 is provided near the lowermost portion of the chamber 133. Minute air bubbles are released by the aeration means 135 into the chamber, and the air helps separate the fluids by promoting the rise of the oil globules containing solid fines and other contaminants to the surface of the fluid within the chamber.

As the first chamber 133 is generally full when the concentrator 13 is activated, the layer of lighter fluid and contaminates floating on the fluid surface in the chamber 133 immediately begins to flow through a baffle-opening 136 into a main chamber 137. The opening includes a flow quietener baffle 138 which facilitates a smooth laminar flow or transition of the surface carried layer and the underlying fluid into the main chamber 137. In this manner disturbance of the interface between the lighter fluid and the heavier coolant fluid within the main chamber is minimized. As the surface carried lighter fluid progresses across the surface of the fluid volume contained in the main chamber 137, it approaches a waste oil/light fluid outlet 139 which has its lowermost portion at or slightly above the interface between the light fluid and the heavier fluid. The oil or light fluid is then removed or skimmed from the tank by the outlet 139 for storage in a separate location.

Flow of fluid beneath the outlet 139 continues through the tank in a tortuous path formed by two vertical baffles 141, 142. The first vertical baffle 141 is fixed to the top of the tank and extends to a distance above the bottom of the tank. The second baffle 142 is fixed to the tank bottom and extends upwardly to within a predetermined distance from the top of the tank. The top portion of the second baffle 142 defines the level of fluid contained within the main chamber. The heavier fluid spills over the top portion of the baffle 142 into a clean fluid storage chamber 143 where it may be immediately removed through a clean fluid outlet 144 through the conduit 120 containing the pneumatic valve 120a and on into the dragout assembly 10. It should be remembered, however, that during certain steps of the process the pneumatic valve 120a is closed to prevent transfer of fluid between the concentrator and the dragout assembly when necessary. It is noted the second baffle 142 is provided an aggolmeration baffle member 145 at its top portion. This baffle member 145 helps agglomerate any light fluid which might have escaped the outlet 139 and survived the tortuous path. The principles of agglomeration are fully explained in the above-identified application incorporated herein by reference.

Also shown in FIG. 4 is the position of the overflow outlet 119 which allows ingress of skimmed fluid from the dragout assembly into the concentrator. The outlet 119 is located below the light fluid outlet 139 a sufficient distance to prevent interruption or disturbance of the interface between the lighter and heavier fluids formed within the main chamber 137. The fluid skimmed from the dragout assembly during the second step of the process will be composed substantially of heavier fluid (coolant) and non-emulsified or free lighter fluid (oil). Separation of the two fluids will then occur within the main chamber 137.

Positioned adjacent one side of the dragout assembly 10 is a storage tank 11 which contains the recovered heavy fluid or coolant. Like the dragout assembly, the tank 11 is provided with an optional cover. A clean coolant outlet 146 is provided in an upper portion of the tank 11 for removal of the recovered fluid for reuse in industrial applications. A second outlet 147 is provided in a lowermost portion of the tank 11 to allow transfer of fluid from the tank to the dragout assembly by the pump 12 through the pipe 122, during the second step of the process. Means 148 for external observation of the level of the fluid within the tank 11 is also provided along one wall of the tank. An inlet 149 in the top portion of the tank 11 allows entry of recovered coolant fluid from the centrifuge 15 into the tank 11 for storage. A conduit or pipe 151 fluidically connects the centrifuge clean coolant fluid outlet (not shown in the drawings) to the tank inlet 149.

The proportioner 16 used during the fourth step of the process is mounted in close relationship to the storage tank 11 in order to facilitate the release of fresh or makeup coolant fluid into the tank 11. The proportioner may be any one of several commercially available devices and preferably is a water-driven, chemical piston porportioner which will automatically dispense a premixed coolant fluid solution at a pre-determined concentration into the tank 11. A coolant concentrate tank 152 is also shown in FIGS. 2 and 3 and provides convenient storage area for the concentrate components used by the proportioner 16.

The centrifuge 15 is mounted above the dragout assembly 10, the clean tank 11, and the oil concentrator 13 in order to utilize the forces of gravity in transferring the various fluids and solids matter from the centrifuge 15. The preferred centrifuge for use in the present invention is shown in U.S. application Ser. No. 368,651, now U.S. Pat. No. 4,406,651, by Denis J. Dudrey, John T. Herman, and Bernard A. Matthys, filed concurrently herewith, and assigned to Donaldson Company, Inc., the disclosure of which is hereby incorporated by reference. However, a suitable substitute for the preferred centrifuge would be the self-purging centrifuge shown, for example, in U.S. application Ser. No. 219,502, now U.S. Pat. No. 4,350,282, filed by Denis J. Dudrey and John T. Herman on Dec. 23, 1980, and assigned to Donaldson Company, Inc., the disclosure of which is hereby incorporated by reference.

Referring again to the drawings, in FIG. 3 the liquid/liquid/solid centrifuge 15 can be seen to have an inlet feed through the pipe 121 from the dragout assembly 10. During the third step and the fifth step of the process the contaminated fluid mixture is processed within the centrifuge and the components are separated apart from each other. The separated heavier fluid or coolant is removed from an outlet in the centrifuge through the pipe 151 to the tank inlet 149 where it is deposited for storage therein. The separated lighter fluid or oil in the centrifuge 15 is removed through a conduit 153 into the concentrator 13 by way of the concentrator inlet 132 for further separation therein and subsequent removal therefrom. Solid matter separated with the centrifuge 15 is purged from the centrifuge and exits through a solid slurry outlet 154 and is redeposited into the dragout assembly 10 for ultimate removal from the system by the scraping mechanism of the dragout assembly.

Finally, a microprocessor/control panel assembly 160 is secured to one side of the dragout assembly at a location which provides convenient access for the operator of the system. An example of a type of microprocessor/control panel suitable for use in the present invention is described in detail in U.S. application Ser. No. 254,751, now U.S. Pat. No. 4,366,069 by myself, Denis J. Dudrey, John T. Herman and Delmer L. Radeztsky, filed Apr. 16, 1981, the disclosure of which is hereby incorporated by reference. The microprocessor/control panel assembly 160 performs the logical requirements of the invention and thus provides an automatic control of the system without the need for several operators to monitor and manually activate the various steps of the invention. The system of course may be operated without the use of a microprocessor.

The entire apparatus is mounted upon a skid-resistant pad or platform 170.

It should be apparent to those skilled in the art that the size and arrangement of the apparatus used to practice the present invention will be determined by the particular volume demands of the industrial setting in which the invention is used. Various modifications, additional equipment, and rearrangements are possible within the scope of the claims which follow.

What is claimed is:

1. A process for separating apart from each other a heavier fluid, a lighter fluid, and particulate matter contained in a contaminated mixture, said process comprising the steps of:
   (a) partially purifying the contaminated mixture by separating relatively heavy particulate matter from the mixture through gravitational settling in a first container and idling the process a pre-determined length of time allowing separable lighter fluid to separate from the mixture and form a layer at the surface of the mixture in the first container;
   (b) transferring from a second container, a volume of substantially uncontaminated heavier fluid into the first container in a manner leaving the layer of separated lighter fluid at the mixture surface undisturbed and in sufficient quantity to raise the fluid surface in the first container to a preselected level;
   (c) after the pre-selected level is reached, skimming the mixture surface by overflowing a portion of the mixture within the first container into a third container;
   (d) concentrating the skimmed fluid in the third container;
   (e) subsequent to step (c), transferring a portion of the partially purified contaminated mixture in the first container to a centrifuge;
   (f) separating in a single pass through the centrifuge the lighter fluid, the heavier fluid and the suspended particulate matter apart from each other within the centrifuge;
   (g) transferring from the centrifuge the lighter liquid to the third container, and the heavier fluid to the second container;
   (h) replenishing the heavier fluid contained in the second container by introducing fresh heavier fluid into the second container in sufficient amounts to achieve a pre-selected level of fluid within the second container;
   (i) after step (h), skimming the surface of the replenished heavier fluid in the second container by overflowing a portion of the fluid into the first container; and
   (j) after a pre-determined interval of time has elapsed following step (i), refreshing the fluid within the second container by circulating fluid from the first container through the centrifuge, and transferring recovered fluid from the centrifuge to the second container.

2. A process for recovering an industrial coolant fluid from a contaminated mixture containing solid matter and a separable waste oil, the process including the steps of:
   (a) first, separating by gravitational forces within a first container a portion of the solid matter from the contaminated mixture and removing the separated solid matter to a remote location then idling the process a pre-determined length of time allowing separable waste oil to separate from the mixture and form a layer at the surface of the mixture;
   (b) transferring from a second container containing previously recovered coolant fluid, a sufficient volume of the recovered coolant fluid to raise the level of fluid in the first container to a pre-selected level and in a manner leaving the layer of separated waste-oil undisturbed at the mixture surface;

(c) skimming surface-carried waste oil from the first container by overflowing the oil into an oil concentrating container;

(d) after skimming the oil, transferring the contaminated mixture from the first container to a centrifuge;

(e) separating in a single pass through the centrifuge, the coolant fluid, waste oil and suspended solid matter apart from each other and transferring the coolant fluid to the second container and the waste oil to the oil concentrating container, and returning the solid matter to the first container;

(f) adding a sufficient volume of pre-mixed fresh coolant fluid to the recovered fluid in the second container to regenerate the fluid and replenish the fluid in the second container to a pre-selected level;

(g) skimming the surface of the fluid within the second container by overflowing and transferring the skimmed fluid into the first container;

(h) after a pre-determined interval of time has elapsed following step (g), transferring fluid in the first container through the centrifuge and then into the second container in a manner aerating the fluid therein, thereby refreshing the recovered fluid contained in the second container; and (i) transferring any resulting overflow volume of recovered fluid from a bottom portion of the second container to the first container and scavenging the bottom of the second container during the transfer of the overflow volume.

3. The process of claim 1 or 2 wherein the initial step of transferring a volume of recovered fluid into the volume of contaminated mixture includes the step of quietening the flow of the fluid as it enters the contaminated mixture.

* * * * *